(12) United States Patent
Hausmann et al.

(10) Patent No.: US 9,701,424 B2
(45) Date of Patent: Jul. 11, 2017

(54) DETACHABLE DETECTION AND WARNING SYSTEM FOR AN AIRCRAFT

(71) Applicant: Gulfstream Aerospace Corporation, Savannah, GA (US)

(72) Inventors: Jeffrey Hausmann, Savannah, GA (US); Frank Manochio, Savannah, GA (US); Jason Meade, Savannah, GA (US); Robert O'Dell, Savannah, GA (US); Jimmy Lee Hancock, Jr., Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 55 days.

(21) Appl. No.: 14/674,916

(22) Filed: Mar. 31, 2015

(65) Prior Publication Data

US 2016/0288923 A1 Oct. 6, 2016

(51) Int. Cl.
*G06F 7/00* (2006.01)
*B64D 47/02* (2006.01)

(52) U.S. Cl.
CPC .................. *B64D 47/02* (2013.01)

(58) Field of Classification Search
CPC ...................................................... B64D 47/02
USPC .......................... 340/945, 961, 981; 701/301
See application file for complete search history.

(56) References Cited

U.S. PATENT DOCUMENTS

| | | | |
|---|---|---|---|
| 4,632,340 A * | 12/1986 | Duea | B64C 3/58 244/1 R |
| 6,118,401 A | 9/2000 | Tognazzini | |
| 6,940,397 B1 * | 9/2005 | Le Mire | 340/426.1 |
| 7,076,366 B2 | 7/2006 | Simon et al. | |
| 7,869,305 B2 * | 1/2011 | Anderson et al. | 367/99 |
| 8,121,786 B2 | 2/2012 | Morbey et al. | |
| 2005/0222769 A1 * | 10/2005 | Simon | G06F 7/00 701/300 |
| 2006/0287829 A1 * | 12/2006 | Pashko-Paschenko | B60Q 5/006 701/301 |
| 2013/0321192 A1 | 12/2013 | Starr et al. | |
| 2015/0206439 A1 * | 7/2015 | Marsden | G08G 5/025 701/301 |

OTHER PUBLICATIONS

Utility U.S. Appl. No. 14/599,758, filed Jan. 19, 2015.
USPTO, Final Office Action in U.S. Appl. No. 14/599,758 mailed Sep. 25, 2015.
The United States Patent and Trademark Office, Non-Final Office Action in U.S. Appl. No. 14/599,758 dated Apr. 9, 2015.
Response to Office Action in U.S. Appl. No. 14/599,758 dated May 29, 2015.

* cited by examiner

*Primary Examiner* — Brent Swarthout
(74) *Attorney, Agent, or Firm* — LKGlobal | Lorenz & Kopf, LLP

(57) ABSTRACT

A system is provided that includes a detachable mounting apparatus. The detachable mounting apparatus is configured to be secured on an aircraft. The detachable mounting apparatus includes a detection system and a warning system. The detection system can detect objects in proximity to the aircraft and generate a detection signal when an object is detected in proximity to the aircraft. The warning system can generate at least one alarm signal that is perceptible outside the aircraft.

15 Claims, 8 Drawing Sheets

DETACHABLE DETECTION AND WARNING SYSTEM FOR AN AIRCRAFT

TECHNICAL FIELD

Embodiments of the present invention generally relate to aircraft, and more particularly relate to a detachable detection and warning system for aircraft.

BACKGROUND

When an aircraft is on the ground a variety of different events can take place that may cause damage to the aircraft. Examples of such events can include, but are not limited to, accidental collisions by other ground vehicles, accidental collisions by other aircraft either taxiing or under tow, accidental collision with fixed structures, impacts with or from objects, etc.

Systems have been proposed to integrate complex surveillance and monitoring equipment in aircraft during manufacturing. This surveillance and monitoring equipment can detect events and generate appropriate warnings to indicate that an object or person is about to contact the aircraft. However, the cost of redesigning aircraft to include this surveillance and monitoring equipment in and on the aircraft is significant and would require significant expenditure by manufactures to incorporate such surveillance and monitoring equipment. The use of onboard surveillance and monitoring equipment also requires electrical power application to the aircraft, which, for example, complicates ground operations and movement of the aircraft.

For existing aircraft, most aircraft owners would chose not to retrofit their aircraft with such surveillance and monitoring equipment because the cost of installing this surveillance and monitoring equipment would make it impractical.

Accordingly, it is desirable to provide technology that can resolve these issues in a cost effective way. It is desirable to provide technology for detecting people or things that approach or come into contact with the aircraft while it is on the ground, and for recording and/or reporting any such incidents that occur with aircraft (e.g., images of an object that is approaching or contacting the aircraft). It would also be desirable to provide technology that can generate alarm signals to provide a warning to indicate that contact with the aircraft is possible when someone or something approaches the aircraft and/or is about to contact with the aircraft. Other desirable features and characteristics of the present invention will become apparent from the subsequent detailed description and the appended claims, taken in conjunction with the accompanying drawings and the foregoing technical field and background.

BRIEF SUMMARY

Various non-limiting embodiments of detachable detection and warning systems for aircraft are disclosed herein.

In one embodiment, a system is provided that includes a detachable mounting apparatus. The detachable mounting apparatus is configured to be secured on an aircraft. The detachable mounting apparatus includes a detection system and a warning system. The detection system can detect objects in proximity to the aircraft and generate a detection signal when an object is detected in proximity to the aircraft. The warning system can generate at least one alarm signal that is perceptible outside the aircraft.

In another embodiment, a detachable detection and warning system is provided that includes a mounting apparatus that is configured to be secured on an aircraft. The mounting apparatus can include at least one sensor that is configured to detect objects in proximity to the aircraft, a processor that is configured to receive a detection signal from the sensor and to generate control signals, and a warning system configured to generate, in response to at least one of the control signals, at least one alarm signal that is perceptible outside the aircraft.

BRIEF DESCRIPTION OF THE DRAWINGS

Embodiments of the present invention will hereinafter be described in conjunction with the following drawing figures, wherein like numerals denote like elements.

DETAILED DESCRIPTION

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention, which is defined by the claims. Furthermore, there is no intention to be bound by any theory presented in the preceding background or the following detailed description.

In many cases it can be difficult and/or costly to provide permanent detection and warning systems in and/or on an aircraft. For example, when an aircraft does not have sensors (e.g., proximity sensors) or imaging devices integrated with the aircraft, it can be inconvenient or undesirable (e.g., costly) to modify the aircraft to integrate those sensors/imaging devices within the aircraft. It would be desirable to provide detection and warning systems that can be readily deployable and temporarily mounted on the aircraft while it is on the ground, and then removed prior to flight.

Figure 1:
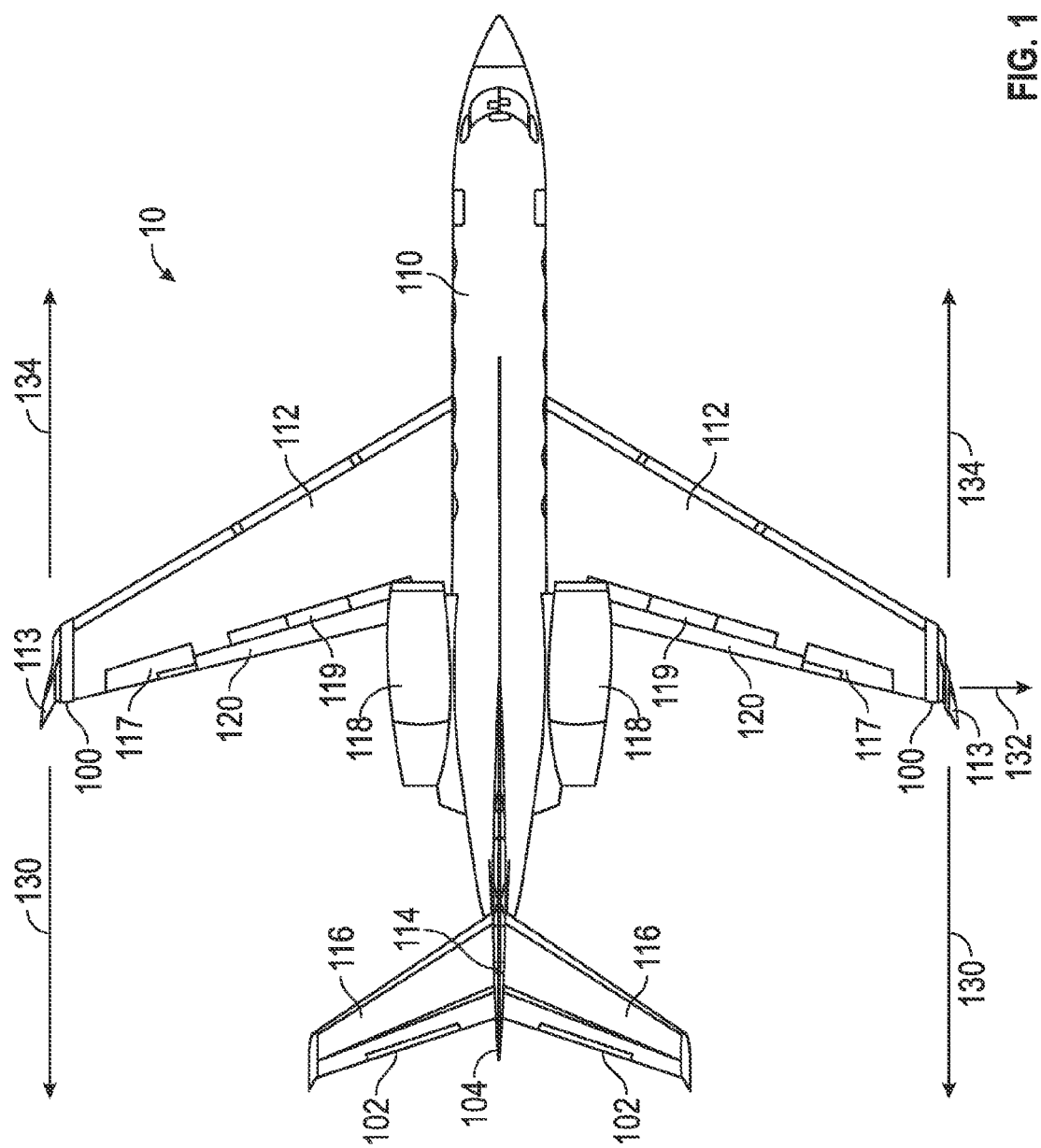
FIG. 1 is a top view of an aircraft in accordance with some of the disclosed embodiments.
Figure 2:
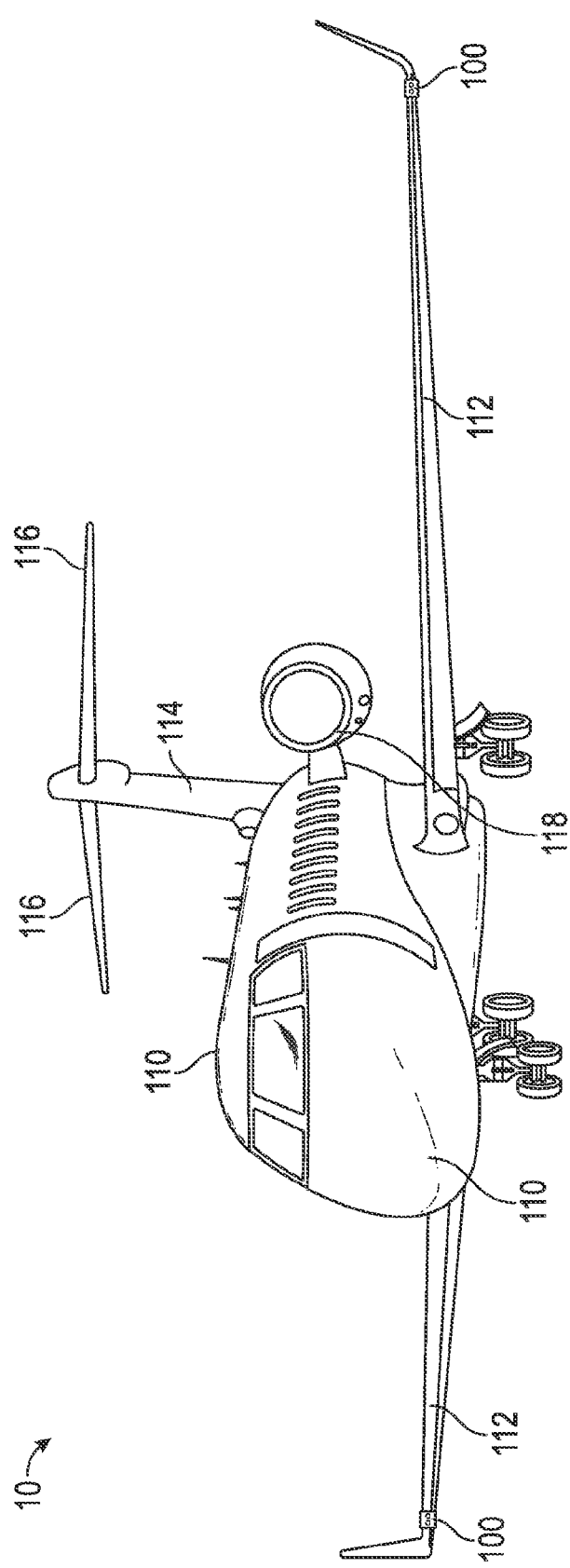
FIG. 2 is a perspective view of an aircraft in accordance with some of the disclosed embodiments.

FIG. 1 is a top view of an aircraft 10, and FIG. 2 is a perspective view of the aircraft 10 in accordance with some of the disclosed embodiments. FIGS. 1 and 2 illustrate two detachable detection and warning systems 100 that are attached to the aircraft 10 in accordance with some of the disclosed embodiments. In this non-limiting implementation, the detachable detection and warning systems 100 are attached to the winglets 113 of the aircraft 10; however, in other implementations the detachable detection and warning systems 100 can be mounted in other locations such as on the jet engines 118, the wings 112, the empennage, or in any other suitable location. Moreover, any number of detection and warning systems 100 can be attached to the aircraft if desired.

In this non-limiting implementation of the disclosed embodiments, the aircraft 10 includes fuselage 110, which holds the passengers and the cargo; two main wings 112, which provide the lift needed to fly the aircraft 10; a vertical stabilizer 114 and two horizontal stabilizers 116, which are used to ensure a stable flight; and two jet engines 118, which provide the thrust needed to propel the aircraft 10 forward. The two main wings 112 include winglets 113 at the end most portions thereof. Flight control surfaces are placed on wings 112, horizontal stabilizers 116, and vertical stabilizers 114 to guide the aircraft 10. Flight control surfaces can include primary and secondary flight control surfaces. The primary flight control surfaces are operated by a pilot located in the cockpit of the aircraft 10, and can include the ailerons 117 located on the trailing edges of the wings of the aircraft 10, the elevators 102 located on the horizontal stabilizer of an aircraft 10, and the rudder 104 located on the vertical stabilizer. The secondary flight control surfaces can include spoilers 119 and flaps 120 provided at the trailing edges of the wings 112 of the aircraft 10.

Although not illustrated in FIGS. 1 and 2, as will be described below, the detachable detection and warning systems 100 can each include different types of sensors, imagers, visual alarm equipment and audio alarm equipment (among other things) that are mounted in and/or on a mounting apparatus that can be attached (e.g., strapped on) to the aircraft (e.g., after flight) and removed from the aircraft (e.g., prior to takeoff). The various sensors can include motion sensors that are configured to detect movement in the vicinity of the aircraft 10. As will be described below, the detachable detection and warning system 100 can help protect the aircraft from being struck by objects that are moving in proximity to the aircraft.

FIGS. 3-6 are diagrams that illustrate different views of a detachable detection and warning system 100 in accordance with the disclosed embodiments. FIGS. 3-7 all show elements that can be part of a detachable detection and warning system, and therefore, FIGS. 3-6 will be described below in conjunction with FIG. 7.

Figure 3:
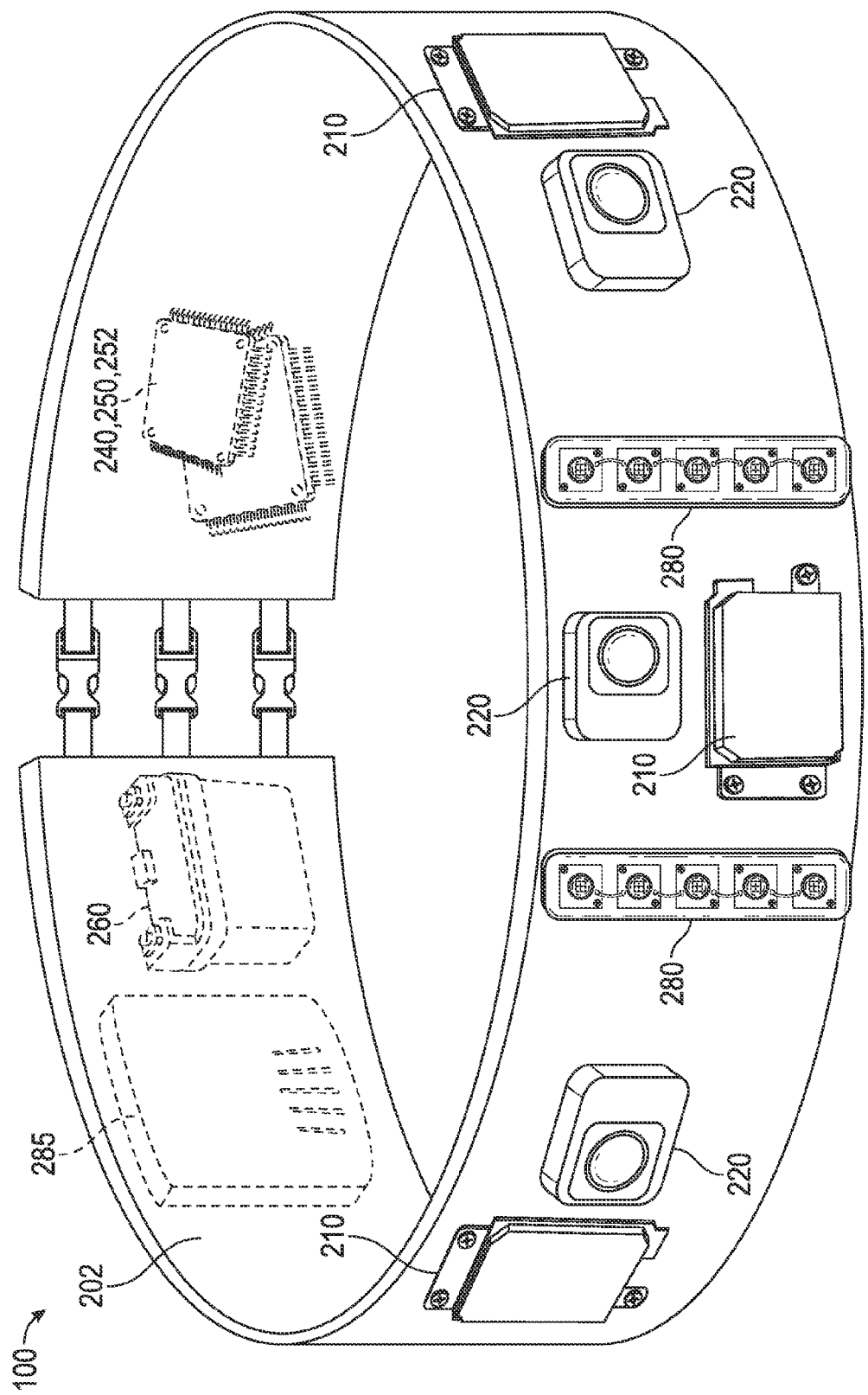
FIGS. 3-6 are diagrams that illustrate a detachable detection and warning system that can be mounted on an aircraft in accordance with the disclosed embodiments.
Figure 4:
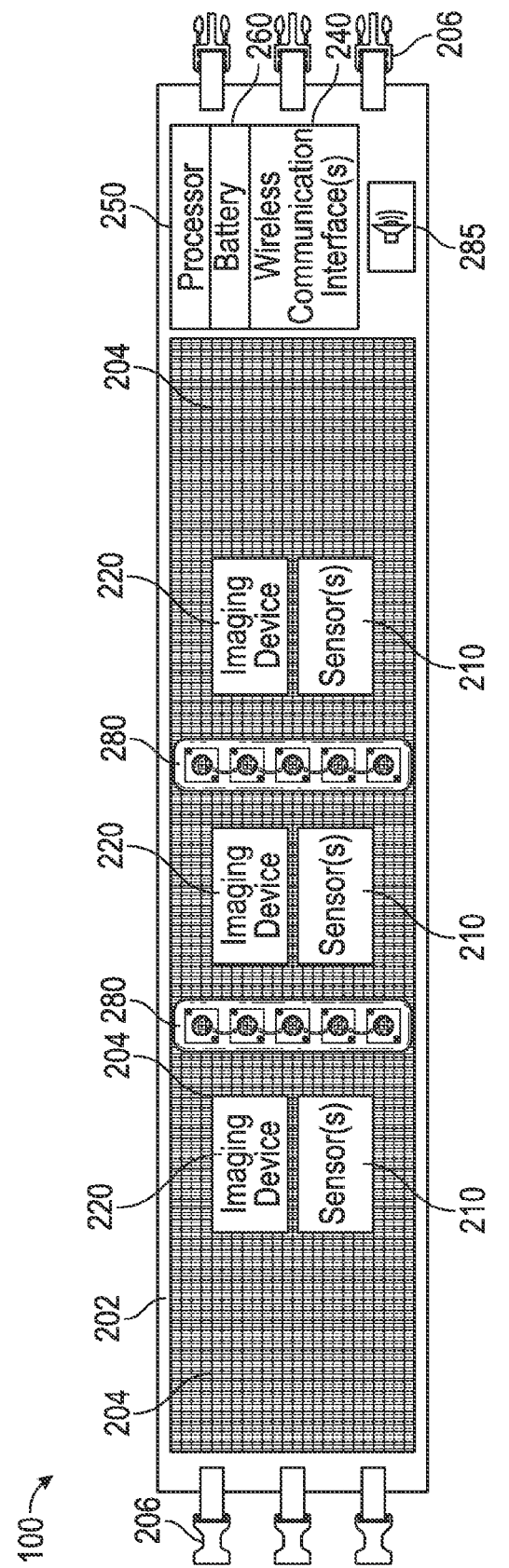

FIG. 3 is a diagram that illustrates various components of a detachable detection and warning system 100 in accordance with one implementation of the disclosed embodiments. FIG. 4 is a diagram that illustrates the layout of the detachable detection and warning system 100 before it is installed on an aircraft in accordance with one implementation of the disclosed embodiments. As will be described below, the detachable detection and warning system 100 can be mounted on the aircraft and used to monitor for objects moving in proximity of the aircraft 10 when the aircraft 10 is located on the ground. As used herein, an object can refer to a person or thing that approaches and/or comes into contact with the aircraft 10. Prior to flight, the detachable detection and warning system 100 can be removed from the aircraft 10.

The detachable detection and warning system 100 includes, among other things, a detection system configured to detect objects in proximity to the aircraft (and/or incidents that occur within proximity of the aircraft), and a warning system configured to generate visual or audible alarm signal(s) that is/are perceptible to persons who are outside the aircraft. These alarm signals can provide an alert to ground personnel or crew in a timely manner so as to avoid impact with the aircraft when it is likely. The alarm signal (or signals) can serve as an alert that an incident is occurring outside the aircraft. For instance, if a vehicle is driving towards the aircraft and about to collide with it, then an alarm will be generated. As will be described below, in both examples, a record of the incident that includes images will be recorded in an incident report file, and can be communicated to another computer. This can help reduce the amount of time required to investigate any incidents that occur, and can save time needed to identify who or what was responsible for damage to the aircraft. It can also provide a record of any person or vehicle that approached the aircraft even if no damage to the aircraft occurred.

Figure 5:
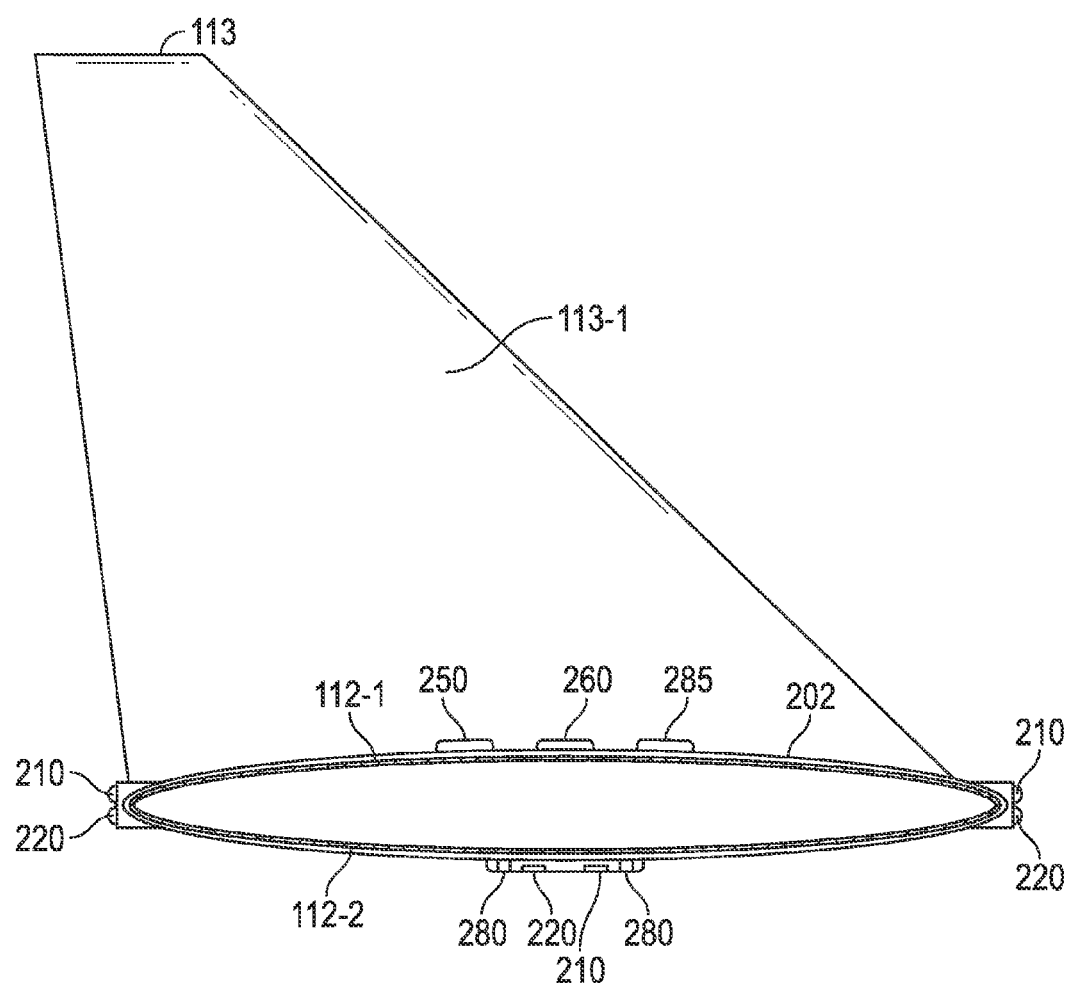
Figure 6:
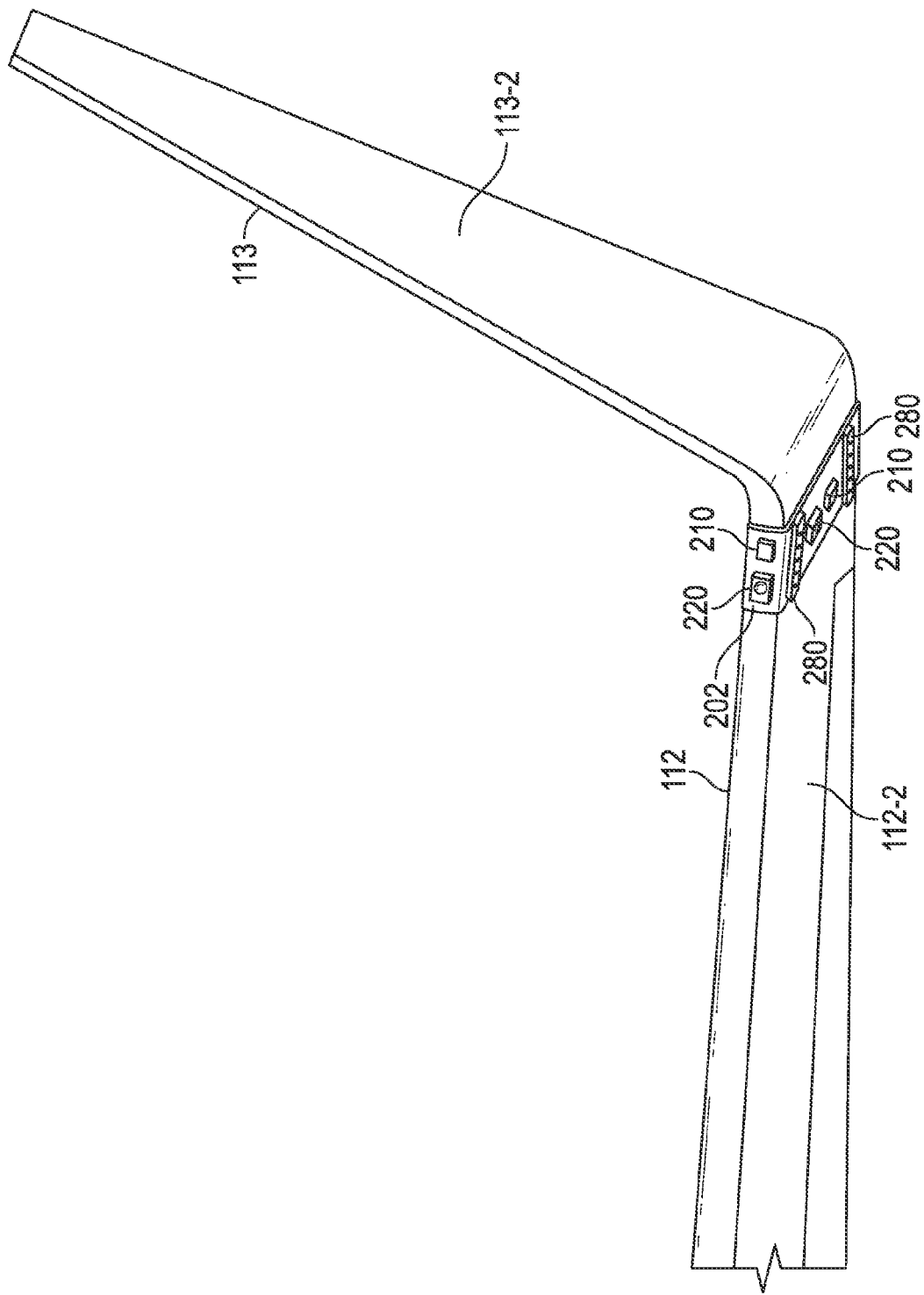

FIG. 5 is a diagram that illustrates a cross sectional view of a wing 112-1 of the aircraft 10 looking inboard with the detachable detection and warning system 100 installed on a wing 112-1 of the aircraft 10 in accordance with one implementation of the disclosed embodiments. FIG. 6 is a diagram that illustrates the detachable detection and warning system 100 after it is installed on a wing 112-1 of the aircraft 10 in accordance with one implementation of the disclosed embodiments.

A detachable detection and warning system 100 is designed or configured to be attached to the aircraft 10 to temporarily mount the detachable detection and warning system 100 to the exterior of the aircraft while the aircraft is on the ground. The detachable detection and warning system 100 includes a mounting apparatus 202 that can be temporarily secured on the aircraft 10. The mounting apparatus 202 is configured to be placed over an exterior surface of the aircraft and wrap around a portion of the aircraft, such as a wing 112 or winglet 113 of the aircraft. Alternatively, the detachable detection and warning system 100 can be attached to other portions of the aircraft such as the fuselage 110, the vertical stabilizer 114, the horizontal stabilizers 116, etc. For example, the mounting apparatus 202 can be secured to the aircraft by sliding the mounting apparatus over a wing 112 or winglet 113 of the aircraft, and then locking it in place while the aircraft is on the ground. In one embodiment, the mounting apparatus 202 is configured to wrap around a portion of the aircraft, and can include protection material to prevent damage to the portion of the aircraft that it is wrapped around. For example, in one implementation, the mounting apparatus 202 can be made from a padded, rip-stop nylon material that securely fits around a wing of the aircraft. Padding on the interior surface of the mounting apparatus 202 prevents the mounting apparatus 202 from scratching an exterior surface of the aircraft that it is wrapped around and in contact with.

In one embodiment, the mounting apparatus 202 is a belt that is configured to wrap around a portion of the aircraft. The belt can include an attachment and locking mechanism 206 that locks the belt on the aircraft to prevent the belt from being removed from the aircraft until the locking mechanism is unlocked. For example, in the embodiment illustrated in FIGS. 4 and 6, the attachment and locking mechanism 206 can be implemented as a quick release mechanism that includes clip connections and a corresponding set of fasteners (e.g., clip connections and/or locking straps and buckles). In some embodiments, to prevent the detachable detection and warning system 100 from being removed from the aircraft, the detachable detection and warning system 100 can include a lock system that prevents the detachable detection and warning system 100 from being removed from the aircraft unless someone has capability to unlock it.

Figure 7:
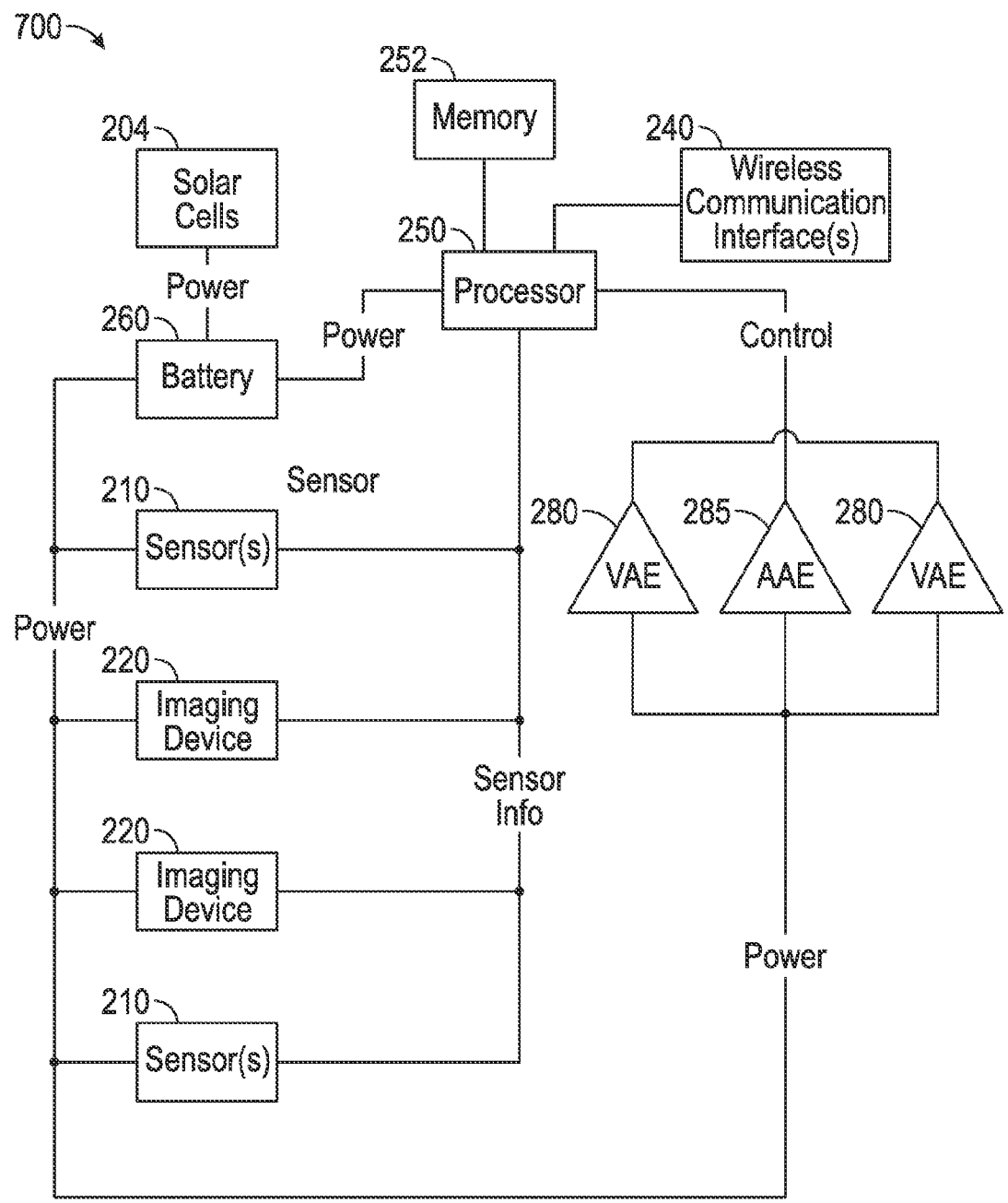
FIG. 7 is a block diagram that illustrates electrical connections between various blocks that make up a detachable detection and warning system in accordance with one implementation of the disclosed embodiments.

FIG. 7 is a block diagram that illustrates electrical connections between various blocks that make up a detachable detection and warning system 100 in accordance with the disclosed embodiments. FIG. 7 will now be described with reference to FIGS. 1-6.

Detection System

Sensors

In one embodiment, the detection system can include a plurality of sensors 210. In FIGS. 3 and 4, although the detection system includes two sensors 210, in other implementations, either fewer or more of the sensors can be implemented, at different locations on the mounting apparatus 202. Thus, although the drawings illustrate two sensors 210, it should be appreciated that the number and respective locations of the sensors are exemplary and non-limiting.

Each sensor 210 can detect objects in proximity to the aircraft. The sensors 210 can include proximity sensors that detect objects in proximity to the aircraft, motion detection sensors that detect movement of objects in proximity to the aircraft, etc.

Figure 8:
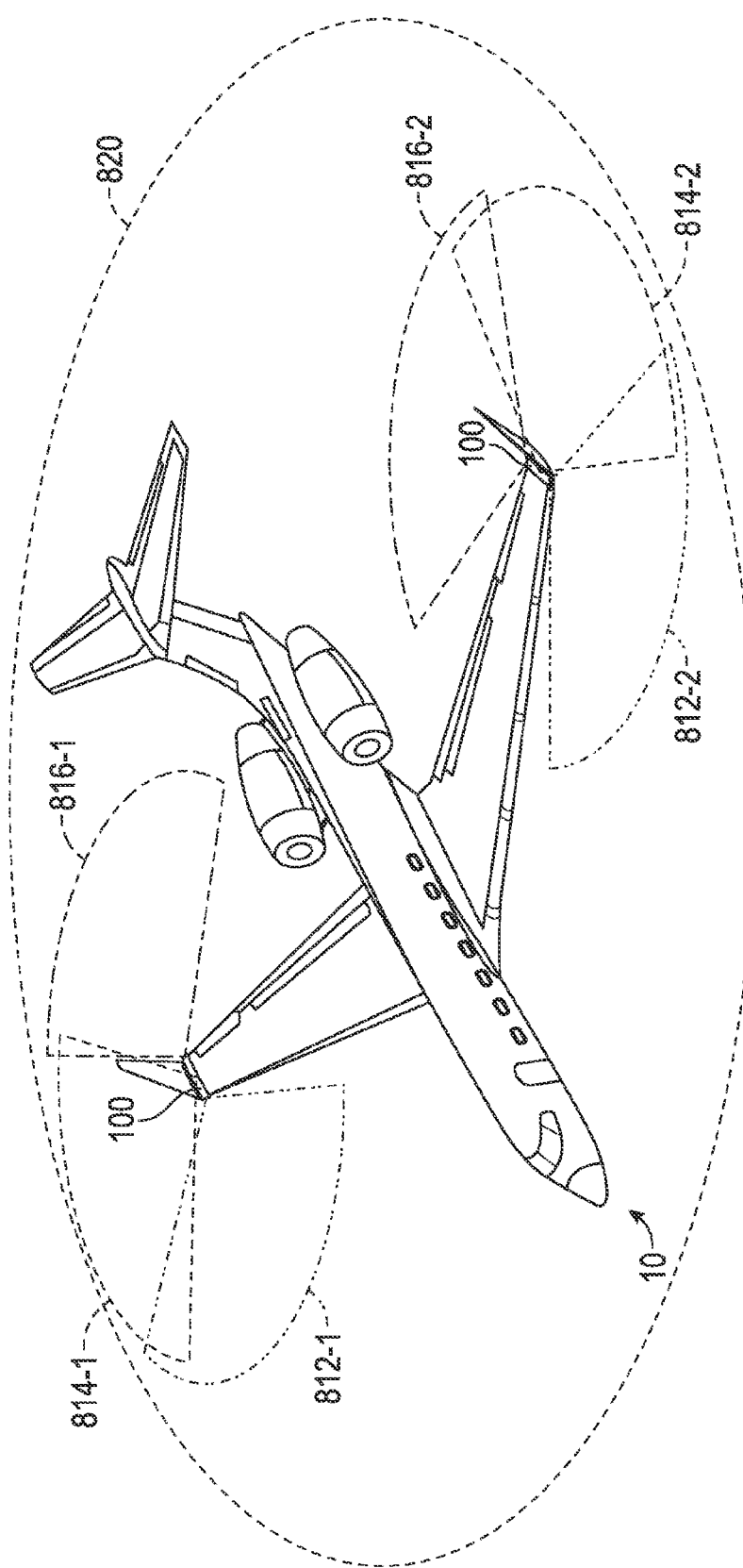
FIG. 8 is a perspective view of an aircraft that illustrates fields of view of sensors that are part of a detachable detection and warning system in accordance with some of the disclosed embodiments.

FIG. 8 is a perspective view of the aircraft 10 that illustrates the field of view of each of the sensors 210 in accordance with some of the disclosed embodiments. In the exemplary embodiment illustrated in FIG. 8, the detachable detection and warning systems 100 are disposed along the wings 112 and/or winglets 113 of the aircraft; however, in other embodiments, the detachable detection and warning systems 100 can be disposed along other surfaces such as opposite rearward-facing sides of the aircraft horizontal stabilizer (or tail) 116, along the aircraft vertical stabilizer 114 (or along the opposite sides of an upper aircraft horizontal stabilizer in some implementations that have a T-tail stabilizer configuration), along opposite rearward-facing sides of the wing tips, on the underside of the aircraft fuselage along the bottom-most portion of the aircraft fuselage, along the nose of the aircraft, along the opposite forward-facing sides of the aircraft horizontal stabilizer, along opposite forward-facing sides of the wings, and along the top-most portion of the aircraft fuselage. Each of the detachable detection and warning systems 100 can include, for example, one sensor 210 has a frontward field of view 812 that covers a region in front of the aircraft 10, another sensor 210 has sideward field of view 814 that covers a region at the side of the aircraft 10, and another sensor has a backward field of view 816 that covers a region behind of the aircraft 10. The sensors 210 can be oriented so that their respective coverage areas are arranged to provide up to a full three-dimensional 360-degree detection coverage (e.g., within a volume defined by the cross-sectional area of ellipse 820) for the aircraft 10 so that any objects, including people, that enter the space surrounding the aircraft 10 (e.g., come within the vicinity of the aircraft 10) can be detected. In other words, the sensor coverage can include any area around the aircraft including a region extending above the aircraft, below the aircraft as well as adjacent to it. As used herein, the term "object" is to be construed broadly as meaning anything that can approach and/or come into contact with an aircraft. An object can refer to, for example, any material thing that is capable of approaching and/or coming into contact with an aircraft.

Specific examples of sensors 210 will now be described.

Motion Sensors

Examples of motion sensors include proximity sensors 210 and motion detection sensors 210, radar sensors that detect movement in the vicinity of the aircraft, ultrasonic sensors that detect movement in the vicinity of the aircraft, infrared sensors, and/or real-time analysis of video imagery generated by the imaging devices 220, etc.

The motion sensors 210 are used to detect objects that may be present within their detection zone (e.g., within a particular region that is in the vicinity of the aircraft 10). The motion sensors 210 emit pulses (e.g., electromagnetic wave pulses, sound wave pulses, pulses of visible, ultraviolet or infrared light, etc.) which are directed and emitted as a broad beam towards a particular detection zone covering the field of view of the sensor. The duration of the pulses define a detection zone of each motion sensor. For a short period of time after each pulse is emitted by that motion sensor, waves may be reflected back towards the sensor by an object. The period of time is approximately equal to the time required for a pulse to travel from the motion sensor 210 to the detection zone and for a portion of the wave that is reflected towards the motion sensor 210 from an object to reach the motion sensor 210. The period of time enables the distance between the motion sensor 210 and an object within the detection zone to be calculated. For example, it is possible to measure the time required for a pulse to be reflected and use the time to calculate a distance between the motion sensor and a reflecting surface of the object. For instance, the distance between the motion sensor 210 and the detection zone can be calculated as the speed of the sensor medium (e.g., speed of light) divided by the time delay between transmitting the pulse and receiving a reflected wave from an object within its detection zone.

The types of motion sensors 210 that are employed may vary depending on the implementation. In one implementation, the motion sensors 210 may be implemented using sonar or ultrasonic sensors (or transceivers) that generate and transmit sound waves. These sensors receive and evaluate the echo that is reflected back to the sensor. The time interval between sending the signal and receiving the echo can be used to determine the distance between the sensor and a detected object.

However, in other implementations, the motion sensors 210 may be implemented using radar sensors, laser sensors, infrared sensors, light detection and ranging (LIDAR) sensors, infrared or laser rangefinders that use a set of infrared or laser sensors and triangulation techniques to detect an object and to determine its position with respect to the aircraft, distance from the aircraft, etc. For example, in one embodiment, the motion sensors 210 can be infrared sensors that include an infrared light transmitter and receiver. Short light pulses are transmitted by the transmitter, and when at least some light pulses are reflected by an object, the object is detected by the receiver. Further, in one implementation, information from one or more of these types of sensors can be used in conjunction with video data from the imaging devices 220 to detect moving objects.

The range of distances that are within the field of view (FOV) of the motion sensors 210 define object detection zones for each motion sensor 210. The range of distances that are within the field of view of the motion sensors 210 can vary depending on the implementation and design of the aircraft 10. In some embodiments, field of view and range of the motion sensors 210 can be varied. For example, the size and location of the detection zone relative to the motion sensor 210 (and therefore the aircraft 10) can be varied.

Communication Interfaces

The mounting apparatus 202 can also include at least one wireless communication interface 240 that is configured to transmit and receive communication signals to communicate information over wireless communication links with other wireless communication interfaces (e.g., of another device). Each wireless communication interface includes a wireless receiver, a wireless transmitter, and an antenna. Each wireless communication interface 240 is operatively and communicatively coupled antennas (not illustrated) so that it can communicate with wireless communication interfaces via one or more of the wireless communication links (not illustrated). Each wireless communication interface can be coupled to a processor 250 and to a power source 260, such as a battery, that provides electrical power. The wireless transmitter can communicate information (e.g., motion information, video images, etc.) acquired by the sensors 210 and imaging devices 220 over a wireless communication link to other devices. This can be done continuously (e.g., for real-time monitoring), or only when an obstacle, incident or event is detected by one of the sensors.

The wireless communication interfaces and wireless communication links can be implemented using any known types of wireless technologies including, but not limited to, Bluetooth, near infrared, WLAN, cellular, etc. Without limitation, the antennas can include, for example, a WLAN antenna that can be used to communicate information with a WLAN access point or interface over a WLAN communication link, a Bluetooth antenna that can be used to directly communicate information to/from another Bluetooth-enabled device, over a Bluetooth communication link, and a near infrared network antenna that can be used to directly communicate information to another device over a near infrared communication link, a cellular network antenna that can be used to communicate information to/from a cellular base station over a cellular communication link.

One function of the wireless communication interface 240 is that it can receive an activation signal or a deactivation signal from another device, and can communicate the activation signal or the deactivation signal to the processor 250 to arm or disarm the detachable detection and warning system 100. For example, a user (e.g., a person such as a pilot, crew, ground personnel, etc.) can use a portable computer (e.g., Smartphone) enter an input or activation command that generates and communicates an activation signal to wireless communication interface 240, which is then relayed to the processor 250 to place the detachable detection and warning system 100 in monitoring mode.

Processor

The mounting apparatus 202 can also include computer hardware that is illustrated as a processor 250 in FIGS. 3, 4, 6 and 7. The processor 250 can be communicatively coupled to each of the blocks as illustrated in FIG. 7 via a data bus used to carry signals communicated between the processor 250, and any of the other blocks of FIG. 7. The computer hardware can also include memory as illustrated in FIG. 7. The memory 252 can be non-transitory computer readable storage media including non-volatile memory (such as ROM, flash memory, etc.), volatile memory (such as RAM), or some combination of the two. The RAM stores software instructions for an operating system and software instructions that are executed by the processor 250 to perform various functions described herein.

In one embodiment, the processor 250 can include a video recorder for recording images generated by the imaging devices 220 and optionally an audio recorder for recording audio information captured by microphones that can be included (not illustrated).

A portion of the RAM can be used to implement temporary buffers that temporarily store images captured by the imaging devices 220. As is known in the art, a "buffer" refers to a portion of a physical memory storage that is used to temporarily store data for a time frame to determine whether that data is need by another computer process or can be discarded. For instance, the temporary buffers described herein can be used to temporarily store a certain amount of image or video data. In one embodiment, prior to receiving a detection signal, the processor 250 stores data from the imaging devices 220 in non-volatile memory in a buffer only mode so that small clips of video information are stored (e.g., a few seconds or minutes of video) so that those small clips can be retrieved if needed. The buffer is designed to hold only a limited amount of the pre-event video data for a limited amount of time before it is discarded unless a detection event occurs in which case the data is stored in a file.

The processor 250 is configured to receive the detection signal from the detection system and to generate control signals that control the visual alarm equipment 280 and/or audio alarm equipment 285 of the warning system to cause the warning system to generate appropriate alarm signal(s).

Imaging Devices

In one embodiment, the mounting apparatus 202 can also include one or more imaging devices. The imaging devices 220 that are employed may vary depending on the implementation. In general, each of the imaging devices 220 can be implemented using a video camera or other image capture apparatus (e.g., cameras). In some implementations, the imaging devices 220 may be implemented using cameras such as high-definition video cameras, video cameras with low-light capability for night operations and/or cameras with infrared (IR) capability, or any combinations thereof, etc.

The imaging devices 220 are disposed at the locations on the mounting apparatus 202 so that when the detachable detection and warning systems 100 are attached to the aircraft 10, the imaging devices 220 are oriented so that their respective fields of view are can provide up to a full three-dimensional 360-degree effective field of view around the aircraft 10. This allows images of any objects in the vicinity of the aircraft 10 to be acquired and monitored. In FIGS. 3 and 4, although the detection system includes two imaging devices 220, in other implementations, either fewer or more of the imaging devices can be implemented, at different locations on the mounting apparatus 202. Thus, although the drawings illustrate two imaging devices 220, it should be appreciated that the number and respective locations of the sensors are exemplary and non-limiting. Thus, although the drawings illustrate two imaging devices 220, it should be appreciated that the number and respective locations of the imaging devices are exemplary and non-limiting.

Each of the imaging devices 220 can be used to acquire images of a particular region around the aircraft (including any objects that may be present in the vicinity of the aircraft 10). Each of the imaging devices 220 is capable of acquiring or capturing images of a particular region (within its field of view) that is in the vicinity of the aircraft 10, and can record images of events taking place in proximity to the aircraft. Stated differently, each of the imaging devices 220 are operable to acquire images of a corresponding detection zone. The images can include detected objects, when present, and therefore, the imaging devices 220 are operable to acquire an image of objects that might be located within a predetermined range of distances and within a field of view associated with the imaging devices 220.

In some embodiments, the field of view of the imaging devices 220 can be fixed. In other embodiments, the field of view of the imaging devices 220 is adjustable and can be varied so that the detection zone can be varied. For example, in one implementation, the imaging devices 220 can be cameras with a variable focal length (zoom lens) which can be varied to vary the FOV and/or direction of view. This feature can be used to vary the range and field of view based on the surrounding area so that the location and size of the space being imaged can be varied. When the imaging devices 220 have an adjustable FOV (e.g., a variable FOV), a processor 250 can command the camera lens to a preset FOV. In general, the field of view of the imaging devices 220 is typically much wider than in comparison to that that of the sensors 210. The range of the imaging devices 220 can also vary depending on the implementation and design of the aircraft 10.

When the processor 250 receives an activation signal it arms or enables the detachable detection and warning system 100 and places it in a monitoring mode. The processor 250 enables the sensors 210 and/or the imaging devices 220. In one embodiment, the imaging devices 220 are relatively low power consumers in comparison to the sensors 210, and only the imaging devices 220 are enabled to observe a volume around the aircraft 10. The imaging devices 220 can have programmable threat detection and classification software that can be used to identify and classify potential threats, discard those which do not warrant activation of the active sensors 210 (e.g. people, animals), and subsequently turn on the active sensors 210 if the threat warrants it. When enabled, images from the imaging devices 220 are recorded by video recorder that can be implemented within the processor (not illustrated) and temporarily stored in a temporary buffer as pre-event video data. The buffer holds a limited amount of data for a limited time period. As the buffers fill with newer data, older data is discarded to make room for the newer data.

If a potential object is detected, the system can be placed in full, active mode. In active mode, the imaging devices 220 are fully activated to capture and record images in the volume surrounding the aircraft 10. In addition, the sensors 210 can also be activated. The sensors 210 perform internal processing to detect and classify potential threats. Although the sensors 210 consume more power, they also provide more accurate detection and classification. For instance, a threat detection algorithm can consider variables such as closure rates and threat size prior to generating detection signals that are communicated to the processor to control activation of visual alarm equipment 280 and/or audio alarm equipment 285. The goal of the threat detection algorithm is to reduce false alarms by filtering out non-threatening ramp activity such as people walking past the aircraft. When one (or more) of the sensors 210 detect a trigger event (e.g., detect any movement or motion within proximity of the aircraft, such as an object or person in vicinity of the aircraft), the sensor(s) can communicate a detection signal to the processor 250 that indicates that one or more of the sensors has detected movement near the aircraft 10. The processor 250 then creates an incident report file and saves the pre-event video data that is currently stored in the temporary buffers to memory 252 in an incident report file so that a record of any incidents in proximity of the aircraft can be created. The processor 250 also continues to save post-event images (provided from the imaging devices 220) in the incident report file as post-event video data until a condition occurs (e.g., expiration of a timer or counter), at which point the processor 250 can also generate a final incident report file and save it to memory 252. The final incident report file can include the pre-event video data and the post-event video data that includes image(s) of an object or person approaching and/or coming into contact with the aircraft 10. The final incident report file can also include other information such as time, date, location, information regarding trigger events and specific sensors that generated the detection signals, data measured by the sensors that generated the detection signals, etc.

In addition, when a trigger event is detected by one or more of the sensors 210 and the processor 250 receives a detection signal from one of the sensors, the processor 250 can also generate a control signal that causes an alarm signal to be generated that is perceptible outside the aircraft 10. For instance, one of the audio alarm equipment 285 (e.g., audio elements) can generate an audible alarm signal and/or one of the visual alarm equipment 280 (e.g., lighting system) can be activated to generate a visual alarm signal. In one embodiment, the imaging devices 220, sensors 210 and/or processor 250 can both determine whether an incoming threat warrants an alert. In one implementation, different alert levels are possible. For example, when it is determined that a threat will pass within a user defined perimeter of the aircraft, but is not likely to contact the aircraft, or if a threat closing in on the aircraft has a relatively low closure rate, then only the visual alarm equipment 280 (e.g., lighting system such as strobes) is activated. By contrast, when the threat continues to close within a user defined perimeter of the aircraft, or if the threat is large and/or has a high closure rate, then a higher level alert can be issued and both the audio alarm equipment 285 (e.g., horns, sirens, speakers, etc.) and the visual alarm equipment 280 (e.g., lighting system such as strobes) can be activated. The alerting can continue until a condition occurs (e.g., the threat withdraws outside the user defined threat perimeter or the system detects a collision). If a collision is detected, the alerting can continue for a user defined period of time then cease.

The processor 250 can also generate an incident report message and communicate the incident report message via the wireless communication interface 240 to another computer (not illustrated) to notify someone that an incident has occurred. The incident report message can be communicated in any known form including, for example, e-mail, text or short message service (SMS), or via an automated phone call, for example, using a pre-recorded message. The incident report message includes information indicating that an incident has taken place in proximity of that particular aircraft, and can include other information such as the date and time the incident occurred, the location of the aircraft when the incident occurred, etc. In some embodiments, the incident report message can also include the final incident report file, while in other embodiments it does not. The external computer can be a computer that is associated with the owner of the aircraft, a computer that is part of a ground support network, a server associated with a maintenance tracking software program that is part of a Computerized Maintenance Program (CMP), a computer associated with an airport security unit or a law enforcement agency, etc.

The processor 250 can also load (from memory 252) and execute, among other things, a sensor program module, a video imager program module, and an alarm generator module. In certain embodiments, these modules are processor-readable instructions stored or included on a non-transitory processor-readable medium, for example. Thus, references to a processor performing functions of the present disclosure refer to any one or more interworking computing components executing instructions, such as in the form of an algorithm, provided on a processor-readable medium, such as a memory 252 associated with a processor 250.

The sensor program module can be programmed to control the field of view of the sensors, and to process detection signals from the sensors whenever an object is detected by the sensors as approaching or contacting the aircraft 10. The video imager program module is programmed to control characteristics (e.g., the field of view) of the video imagers and video image signals generated by the video imagers. The video imager program module also controls processing of the video image signals. In some implementations, the video imager program module may be configured to process images (e.g., raw camera data) received from the video imagers so as to determine the range of an object from the video imagers, movement of an object, etc. This data can be used by the processor 250 to perform one or more tasks. The alarm generator module is configured to receive detection signals communicated from any of the sensors. Upon receiving a detection signal from a particular sensor that has detected an object, the processor 250 determines that an object is located in proximity to and/or contacting the aircraft 10, and generates an alarm generator signal that it communicates to the visual alarm equipment 280 and/or audio alarm equipment 285.

Warning System

In one embodiment, the warning system can include visual alarm equipment 280 that can generate a visual indication that is perceptible outside the aircraft and provide a warning that a collision is possible, and audio alarm equipment 285 that can generate an audible indication that is perceptible outside the aircraft and provide a warning that a collision is possible.

The visual alarm equipment 280 can be any known type of visual alarm equipment. In one embodiment, the visual alarm equipment 280 can include things such as lights (e.g., LED strobe lights) that are mounted on the mounting apparatus 202.

The audio alarm equipment 285 can include any known types audio elements such as speakers, horns, bells, etc. that are mounted on the mounting apparatus 202.

When an object (not illustrated) is detected by any of the sensors 210, the visual alarm equipment 280 and/or audio alarm equipment 285 can generate alarm signals that are perceptible outside the aircraft 10 to provide a warning that the object has been detected.

Although the warning system includes two instances of visual alarm equipment 280 and one instance of audio alarm equipment 285, in other implementations, either fewer or more of each can be implemented, at different locations on the mounting apparatus 202.

Power Sources

The mounting apparatus 202 can include power sources that provide electrical power for the detachable detection and warning system for the aircraft 10 and all of its components that use electrical power. In one embodiment, the power source is a self-contained power supply that does not require any external connections and can power the system for long periods of unattended surveillance. For example, the power source can include an energy storage device such as a battery 260 that is configured to supply the electrical power for the detachable detection and warning system for the aircraft 10 and all of its components that use electrical power.

In one embodiment, the mounting apparatus 202 can include a plurality of solar cells 204 (or photovoltaic cells) integrated within the mounting apparatus 202 and configured to generate electrical energy to recharge the battery 260 (and thus supply electrical power stored in the battery 260). The solar cells 204 can be implemented using solar panels that are integrated with the mounting apparatus 202. Each solar cell is an electrical device that converts the energy of light directly into electricity by the photovoltaic effect. This electrical energy is then stored in battery 260.

Those of skill in the art would further appreciate that the various illustrative logical blocks, modules, and circuits described in connection with the embodiments disclosed herein may be implemented as electronic hardware, computer software, or combinations of both. Some of the embodiments and implementations are described above in terms of functional and/or logical block components (or modules). However, it should be appreciated that such block components (or modules) may be realized by any number of hardware, software, and/or firmware components configured to perform the specified functions. To clearly illustrate this interchangeability of hardware and software, various illustrative components, blocks, modules, and circuits have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The processor described herein may be embodied directly in hardware, in software modules executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary non-transitory storage medium is coupled to the processor such the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system, comprising:
  a detachable mounting apparatus that is configured to be secured on an aircraft, comprising:
    a belt that is configured to wrap around a portion of the aircraft, wherein the belt comprises: protection material to prevent damage to the portion of the aircraft that the belt is wrapped around, and a locking mechanism that locks the belt on the aircraft to prevent the belt from being removed from the aircraft until the locking mechanism is unlocked;
    a battery that is configured to supply electrical power for the system;
    solar cells integrated within the belt and configured to generate electrical energy to supply at least part of the electrical power;
    a detection system configured to detect objects in proximity to the aircraft and to generate a detection signal when an object is detected in proximity to the aircraft;
    an imaging device configured to capture and record at least one image of the object that is in proximity to the aircraft; and
    a warning system configured to generate at least one alarm signal that is perceptible outside the aircraft.

2. The system according to claim 1, wherein the warning system comprises:
  visual alarm equipment configured to generate a visual alarm signal that is perceptible outside the aircraft.

3. The system according to claim 1, wherein the warning system comprises:
  audio alarm equipment configured to generate an audible alarm signal that is perceptible outside the aircraft.

4. The system according to claim 1, wherein the detection system comprises:
  a sensor that is configured to detect objects in proximity to the aircraft.

5. The system according to claim 4, wherein the sensor comprises:
  a proximity sensor that is configured to detect objects in proximity to the aircraft.

6. The system according to claim 4, wherein the sensor comprises:
  a motion detection sensor that is configured to detect movement of objects in proximity to the aircraft.

7. The system according to claim 1, wherein the detachable mounting apparatus further comprises:
  a wireless communication interface that is configured to transmit and receive communication signals.

8. The system according to claim 1, wherein the detachable mounting apparatus further comprises:
  a processor that is configured to receive the detection signal from the detection system and to generate control signals that control the warning system and cause the warning system to generate an alarm signal that is perceptible outside the aircraft.

9. The system according to claim 1, wherein the portion of the aircraft is a wing of the aircraft.

10. The system according to claim 1, wherein the portion of the aircraft is a winglet of the aircraft.

11. A detachable detection and warning system, comprising:
  a mounting apparatus that is configured to be secured on an aircraft, the mounting apparatus comprising:
    a belt that is configured to wrap around a portion of the aircraft, wherein the belt comprises: protection material to prevent damage to the portion of the aircraft that the belt is wrapped around, and a locking mechanism that locks the belt on the aircraft to prevent the belt from being removed from the aircraft until the locking mechanism is unlocked;
  a sensor that is configured to detect objects in proximity to the aircraft and to generate a detection signal when an object is detected in proximity to the aircraft; and
  a processor that is configured to receive the detection signal from the sensor and to generate control signals;
  a warning system configured to generate, in response to at least one of the control signals, at least one alarm signal that is perceptible outside the aircraft;
  a power source configured to supply electrical power for the sensor, the processor, and the warning system;
  solar cells integrated within the mounting apparatus and configured to generate electrical energy to supply at least part of the electrical power to the power source;
  an imaging device configured to capture and record at least one image of the object that is in proximity to the aircraft; and
  a wireless communication interface that is configured to transmit and receive communication signals.

12. The detachable detection and warning system according to claim 11, wherein the wireless communication interface is configured to receive an activation signal or a deactivation signal from another device, wherein the activation signal controls the processor to arm the detachable detection and warning system and place the detachable detection and warning system in monitoring mode, and wherein the deactivation signal controls the processor to disarm the detachable detection and warning system.

13. The detachable detection and warning system according to claim 11, wherein the processor further comprises:
  a video recorder configured to store the at least one image in a temporary buffer.

14. The system according to claim 1, wherein the wireless communication interface is configured to receive an activation signal or a deactivation signal from another device, wherein the activation signal controls the processor to arm the detachable detection and warning system and place the detachable detection and warning system in monitoring mode, and wherein the deactivation signal controls the processor to disarm the detachable detection and warning system.

15. The system according to claim 1, wherein the processor further comprises:
  a video recorder configured to store the at least one image in a temporary buffer.

* * * * *